US008700257B2

(12) United States Patent
Tamura et al.

(10) Patent No.: US 8,700,257 B2
(45) Date of Patent: Apr. 15, 2014

(54) CONTROL METHODOLOGY OF PEDESTRIAN KINEMATICS USING THE ACTIVE HOOD LIFT SYSTEM

(75) Inventors: Atsutaka Tamura, Blacksburg, VA (US); Stefan Duma, Blacksburg, VA (US)

(73) Assignees: Toyota Motor Engineering & Manufacturing North America, Inc., Erlanger, KY (US); Virginia Tech Intellectual Properties, Inc., Blacksburg, VA (US)

( * ) Notice: Subject to any disclaimer, the term of this patent is extended or adjusted under 35 U.S.C. 154(b) by 666 days.

(21) Appl. No.: 12/779,325

(22) Filed: May 13, 2010

(65) Prior Publication Data
US 2011/0282538 A1 Nov. 17, 2011

(51) Int. Cl.
G06F 7/00 (2006.01)
B60R 22/00 (2006.01)
E05F 15/00 (2006.01)
G05D 1/00 (2006.01)
G05D 3/00 (2006.01)
G06F 17/00 (2006.01)

(52) U.S. Cl.
USPC .............................................. 701/36; 701/45

(58) Field of Classification Search
USPC .......................... 701/31.4, 45, 36; 180/69.21; 296/187.04
IPC ....................................................... B60R 21/38
See application file for complete search history.

(56) References Cited

U.S. PATENT DOCUMENTS

| 5,697,467 | A  | * | 12/1997 | Howard ..................... 180/69.21 |
| 6,182,782 | B1 | * | 2/2001  | Matsuura et al. ............. 180/274 |
| 6,329,910 | B1 | * | 12/2001 | Farrington .................... 340/436 |
| 6,345,679 | B1 | * | 2/2002  | Sasaki ........................... 180/274 |
| 6,378,898 | B1 | * | 4/2002  | Lewis et al. .................... 280/733 |
| 6,571,901 | B2 | * | 6/2003  | Lee ................................ 180/274 |
| 7,232,178 | B2 | * | 6/2007  | Neal et al. ................. 296/187.04 |
| 7,303,040 | B2 |   | 12/2007 | Green et al. |
| 2004/0186643 | A1 | * | 9/2004 | Tanaka et al. .................... 701/45 |
| 2005/0264036 | A1 | * | 12/2005 | Kramarczyk et al. ... 296/187.03 |
| 2006/0290172 | A1 | * | 12/2006 | Hirata et al. ............. 296/187.04 |
| 2008/0093150 | A1 |   | 4/2008  | Schramm et al. |
| 2009/0289474 | A1 |   | 11/2009 | Kim et al. |
| 2010/0089048 | A1 | * | 4/2010  | Schaefer ......................... 60/407 |
| 2011/0196577 | A1 | * | 8/2011  | Mueller ......................... 701/45 |

OTHER PUBLICATIONS

Nagatomi K., Hanayama K, Ishizaki T, Sasaki S, and Matsuda K, "Development of full-scale dummy tests of a pop-up hood system for pedestrian protection", Proceedings of 19th Int'l Technical Conference on the Enhanced Safety of Vehicles (2005) Paper No. 5-0113, Washington, DC (USA).
Frederiksson R, Boström O, Zhang L, and Yang KH, "Influence of pop-up hood systems on brain injuries for vulnerable road users", Proceedings of IRCOBI Conference (2006), Madrid, Spain.
Oh C, Yang YS, and Kim W, "Assessing the safety benefits of an advanced vehicular technology for protecting pedestrians", Accid Anal Prev, 40 (2008).

* cited by examiner

Primary Examiner — Fadey Jabr
Assistant Examiner — Lail Kleinman
(74) Attorney, Agent, or Firm — Christopher G. Darrow; Young Basile Hanlon & MacFarlane P.C.

(57) ABSTRACT

A method and device for use in pedestrian-vehicular collisions in which an active hood lift system is deployed to a first elevated lift position and maintained at the deployed position for an interval after which it is lowered, thereby controlling pedestrian impact kinetics and reducing forces that can result pedestrian injuries.

16 Claims, 4 Drawing Sheets

CONTROL METHODOLOGY OF PEDESTRIAN KINEMATICS USING THE ACTIVE HOOD LIFT SYSTEM

BACKGROUND

The present invention relates to devices and methods for reducing injury in some types of vehicle/pedestrian collisions. More particularly, the present invention pertains to methods and devices that mitigate pre-contact and post-contact injuries arising from some types of vehicle/pedestrian collisions such as traumatic brain injuries.

Many devices have been proposed to reduce the incidence of impact resultant head injuries in collisions between vehicles and pedestrians. Among them are various pop-up hood assemblies.

Impact resultant head injuries have been modeled and characterized using analysis based upon "Head Injury Criterion" (HIC) value. Various safety devices have been developed based on tests directed to and derived from head injury criterion value. The potential severity of traumatic brain injury (TBI) resulting from pedestrian-vehicle collisions is assessed by the HIC value obtained from the regulatory impactor test in which a free flight head form (human head size) is propelled to impact against a stationary vehicle to replicate head injury accidents involving pedestrians.

Head injury criterion (HIC) is a measure of the likelihood of head injury arising from an impact. It is defined as:

$$HIC = \left\{ \left[ \frac{1}{t_2 - t_1} \int_{t_1}^{t_2} a\, dt \right]^{2.5} (t_2 - t_1) \right\}_{max}$$

when $t_1$, and $t_2$ are initial and final times (in seconds) of the interval during which HIC attains maximum value and "a" is gravitational acceleration applied to the head. Typically, the maximum time duration $(t_2 - t_1)$ is limited to a specific value such as 36 ms for example, with $t_2 - t_1$ generally being less than or equal to 15 ms.

While head injury criterion is a valuable tool for modeling the nature and severity of certain types of head impact injuries, an entire profile of serious injuries can arise as a result of pedestrian vehicle collisions that may not be encompassed or adequately evaluated by head injury criteria. Traumatic brain injury (TBI) can be closely associated with non-impact traction force due to inertia loading prior to head strike with a striking vehicle.

Thus, it may be desirable to provide an active hood lift method, system, and device for use with automotive vehicles that can protect pedestrians from at least a portion of the impact modes found to result in injuries.

SUMMARY

Disclosed herein is a method for reducing the incidence and/or severity of pedestrian injury in the event of a collision between a pedestrian and an automotive vehicle in which the automotive vehicle is equipped with a hood and an active hood lift system. The method includes the step of deploying the hood from the vehicular use position to an elevated position in which the rear end of the hood proximate to the windshield is raised a spaced distance from the use position. The deployed hood is maintained in the deployed elevated position for an intermediate hold interval after which the hood is lowered to at least one second position.

An active hood lift system for an automotive vehicle is also disclosed herein. The active hood lift system includes at least one crash sensor mounted on the automobile configured to detect a pedestrian and/or to receive information relating to a crash event and produce at least one output. The active hood lift system further including means for elevating the rear end of the hood proximate to the windshield to a defined hood elevation and maintain the hood in that position for an interval. The active hood lift system also has an electronic control unit configured to receive the crash sensor output and formulate at least one command actionable on the hood elevating means to elevate and maintain the hood in an elevated position for the defined interval. The active hood lift system also includes means for lowering the rear end of the hood to a second lowered position after the defined interval.

Also disclosed is a method for use during collisions between a pedestrian and an automotive vehicle that includes steps of electronically detecting the presence of a pedestrian in a field of vehicular travel and electronically assessing at least one characteristic of vehicular travel. This method also includes the step of evaluating data derived from the electronic detection step and the electronic vehicular assessment step to generate at least one responsive command actionable on an active hood lift system resident in the automotive vehicle and initiating the active hood lift system upon receipt of the response command to alter and control operation of the active hood lift system during a crash event.

DESCRIPTION OF THE DRAWINGS

In order to facilitate the present disclosure, reference is made to the following illustrative drawing figures in which like reference numerals are employed where appropriate throughout the various views.

DETAILED DESCRIPTION

The present disclosure relates to a method and procedure for reducing the incidence and/or severity of injury resulting from collisions between a pedestrian and an automotive vehicle in some types of pedestrian-vehicle collisions paying particular attention to collisions and vehicular accidents that can result in traumatic brain injury.

Traumatic brain injury can be a contributing factor in the severity of traffic injuries involving pedestrians. For purposes of this disclosure, this type of injury can be defined broadly as damage to the brain resulting from external mechanical force. Injury can occur due to direct head impact. Injury can also be caused by processes such as rapid acceleration or deceleration occurring as a result of noncontact or inertial loading that causes movement of the brain within the skull and results in diffuse injuries.

Various embodiments disclosed herein address at least some of the crash modalities that can give rise to at least a portion of the types of injury that result from pre-contact and post-contact head trauma. In addition, the present disclosure presents methods and devices that address impact-induced trauma assessed by measurements associated with Head Injury Criterion (HIC) values. The method and device disclosed seek to reduce injuries sustained as a result of trauma that occurs before head strike in addition to those that arise as a direct result of impact.

The method for reducing pedestrian head injury resulting from collisions between a pedestrian and an automotive vehicle broadly encompasses the use of a pop-up hood system or active hood lift system configured to lift the rear end of the hood of an automobile from a vehicle operation position to an elevated first lift position. The method is broadly illustrated in sequential FIGS. 1A, 1B, and 1C, and is outlined in the process diagram in FIG. 2.

Figure 1A:
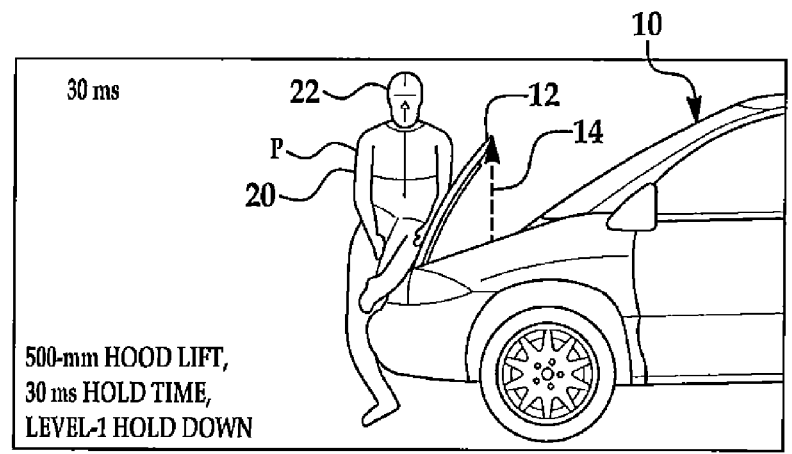
FIGS. 1A through 1C are directed to a sequential depiction of deployment of an active hood lift system according to an embodiment of the invention as disclosed herein together with representative pedestrian kinematics.
Figure 2:
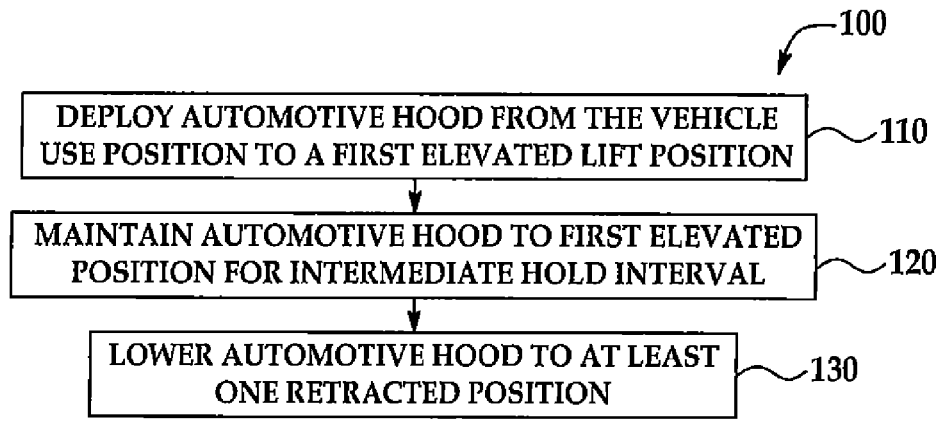
FIG. 2 is a general process diagram of an embodiment of the method of active hood deployment according to an embodiment of the present invention as disclosed herein.

In the method 100, the rear portion of hood 12 associated with vehicle 10 is deployed to a first elevated position 14 as depicted in FIG. 1A. This deployment step is depicted as reference numeral 110 in FIG. 2 and provides an interspace between the hood component and solid components housed underneath the hood, such as the engine and battery, due to the lifted height of hood 12. The lifted hood 12 provides a deformable surface for cushioned contact during impact.

The method 100 also includes the step of maintaining the rear portion of hood 12 in the first elevated position 14 for an intermediate hold interval as at reference numeral 120. Upon expiration of the hold interval, the rear portion of hood 12 is retracted to at least one retracted position 18 as at reference numeral 130. The retracted position is higher than the original position of the rear portion of hood 12.

The retraction step 130 can be a controlled reversal of the hood deployment motion that occurs over a suitable retraction interval. The retraction step 130 can accomplish reversal of the rear portion of the hood 12 to a position that is lower than the first elevated lift position. The final or ultimate post crash position of the rear portion of hood 12 after the crash sequence is complete can be equal to the initial use position where desired or required. However, in many embodiments, the ultimate position of the rear end of the hood 12 is above its original pre-crash (or use) position and can be equal to the retracted position attained in retraction step 130. For purposes of this disclosure, the crash event is considered complete upon the first occurrence of either: the head of the pedestrian makes initial contact with the vehicle or forward momentum of the pedestrian toward the main body of the vehicle ceases.

The retraction step 130 is accomplished as a controlled reversal of the forward motion of hood 12 through one or more various retraction levels. In the process depicted in FIGS. 1A through 1C, the retraction step 130 is an essentially continuous process to an at least one intermediate level 18 (as illustrated in FIG. 1C). The controlled reversal to the intermediate retraction level will be a process and level that minimizes impact energy in any subsequent primary head-vehicle collision. Movement from the level attained in the elevation attained in the deployment and maintenance steps to the lower hood elevation level will occur over an interval suitable to achieve a reduced impact force in the event the head of the pedestrian contacts the vehicle.

The method 100 may also include the step of detecting the presence of a pedestrian in the path of travel of the automotive vehicle. Pedestrian detection can be accomplished by any suitable method such as by identification by at least one sensor device mounted on the vehicle 10.

Deployment of the rear of the automotive hood 12 can occur at a point prior to or contemporaneously with contact between the pedestrian P and the automotive vehicle 10. The vehicle 10 may be equipped with a variety of visual and/or contact sensors. Where visual sensors are employed, pedestrian detection and hood deployment to the first elevated lift position may occur in the interval immediately prior to pedestrian contact with the oncoming vehicle. It is also within the purview of the present disclosure for the deployment step to be coincident with pedestrian contact. In this latter scenario, the vehicle 10 may have pressure sensors located on the leading surfaces of the vehicle such as the front bumper that detect the pedestrian and trigger deployment. The type and nature of pedestrian sensing systems and/or timing of deployment can vary depending on vehicle configuration, traffic safety regulations, governmental requirements and the like.

Regardless of the mode of pedestrian detection, method 100 contemplates that deployment or hood lift may be controlled such that maximum hood stroke value is reached at a point equal or immediately prior to substantial contact between the pedestrian P and hood 12. The stroke value of deployment, as well as variables such as deployment rate, hold time and retraction rate and retraction level can be situation dependent. These process variables are calculated based upon at least one of: pedestrian size and impact speed (predicted or calculated). Thus the method and device disclosed herein may include steps directed to ascertainment of the approximate size of the pedestrian and result in variation of the timing and/or stroke value of the hood lift cycle to provide a "soft catch" event that accommodates these variations. In the embodiments of the method disclosed herein, full deployment is considered to be a maximum stroke value greater than 100 mm. In certain applications, the stroke value will be between 100 mm and 500 mm, with a stroke value between 100 mm and 400 mm employed in certain situations.

In pedestrian impacts utilizing the $50^{th}$ percentile American male whole body model and a full scale vehicle having a minivan configuration that is progressing in a manner that results in a striking velocity of 25 mph, optimal hood stroke could be 500 mm. In this scenario, a deployment interval of 30 ms may be employed. The deployment interval can be varied depending on factors including, but not to limited to, impact speed, pedestrian size, etc. In some embodiments, it is contemplated that hood intervals of 30 ms or less will be desired.

In the scenario depicted in FIG. 1A, full deployment of the hood 12 to the first elevated lift position 14 occurs at 30 ms. The full deployment in this scenario is a maximum hood stroke value of 500 mm. At the point of maximum hood stroke, the pedestrian P is oriented such that torso 20 and head 22 remain in upright aligned relationship with the upper torso 20 and head 22 of pedestrian P generally away from contact with hood 12. This interval is graphically depicted as in FIG. 6 as the deployment phase or hood lift 310.

In method 100, the automotive hood 12 is maintained at the elevated lift position for an intermediate interval. This is graphically depicted in FIG. 6 as hold interval 320. The hold time interval 320 is one sufficient to permit increasing contact between hood 12 and upper torso 20 of pedestrian P in the manner illustrated in FIG. 1B. The actual value of intermediate interval can vary depending upon factors including, but not limited to, vehicle speed, pedestrian size, etc. The optimum value of the intermediate interval (hold time) will be calculated based upon various target factors.

Figure 1B:
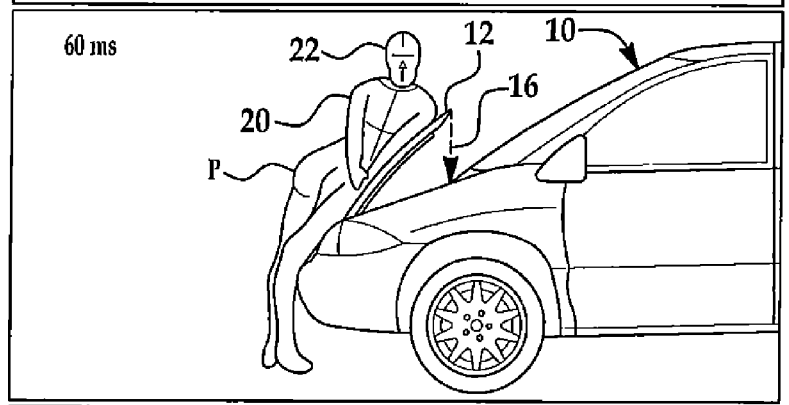
Figure 1C:
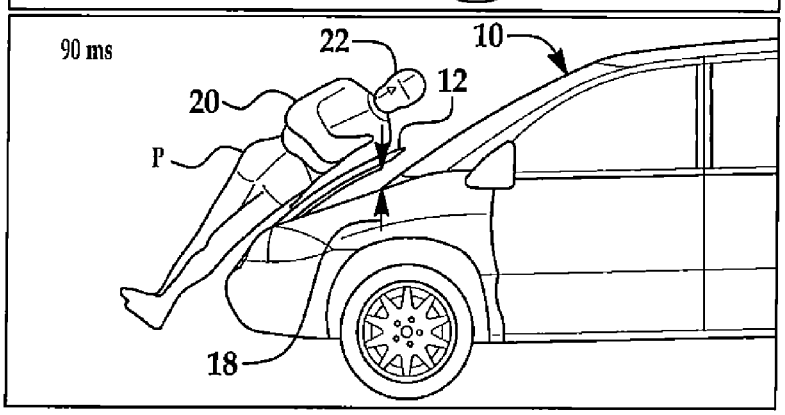

In certain embodiments such as the scenario depicted in FIGS. 1A through 1C, the method 100 will have an intermediate interval (hold time 320) of up to 30 ms. The hold time 320 can conclude at a point prior to or coincident with the occurrence of an impact force maximum between hood 12 and pedestrian P. In various embodiments, it is contemplated that the impact force maximum coincides with general alignment of torso 20 with the plane of hood 12. At the conclusion of the hold time interval 320, the direction of travel of hood 12 is revised as depicted by arrow 16.

Method 100 also includes the step of lowering the automotive hood 12 to at least one retracted position at the end of the hold time 320. The lowering or hood down phase 330 is a controlled reversal of direction of travel of the hood 12 back toward the initial hood orientation. The hood 12 can be retracted to a final position generally equal to the initial hood orientation. It is also contemplated that the travel of the hood 12 during the hood down phase can terminate at a position that is less than maximum hood stroke but greater than the initial orientation of the hood 12 at the beginning of the process.

In the embodiment of the method depicted in FIGS. 1A through 1C, retraction in the hood down phase can proceed to a level denoted at reference numeral 18 In the embodiment depicted, lowered level 18 is less than 50% of the maximum stroke value. The speed of retraction and the ultimate position of lowered level 18 can be situation dependant based upon initial factor such as pedestrian size and impact velocity. The speed and ultimate level of retraction can also be dynamically derived based upon measurements taken during the crash event related to the impact force occurring at the elevated hood and the required counterforce exerted during retraction necessary to achieve a "soft catch". In the scenario depicted in FIG. 1C, the retraction interval is 90 ms. Retraction intervals of up to 100 ms are generally contemplated. At the end of the retraction interval, the upper torso 20 of pedestrian P has made contact with the hood 12 and general alignment between the spine and head 22 has been re-established.

It is contemplated that the hood 12 can be held in the elevated first position for an interval sufficient to permit alignment of the upper torso 20 of the pedestrian P with the hood 12. Upon alignment, the direction of travel of the hood 12 will be reversed and hood 12 will decline at a rate compatible with the continued apparent forward travel of the pedestrian P relative to hood 12 occurring as a result of the continued forward travel of vehicle 10 at this point in the crash event.

The mechanism and method responds to contact by pedestrian P with hood 12 by initiating a controlled retraction. This permits a reduction of the momentum of the pedestrian P relative to the vehicle 12. This accomplishes a "soft catch" of the pedestrian, cushioning and reducing impact energy during contact between the pedestrian torso 20 and prior to initial contact between head 22 and the vehicle 10. The process also cushions and reduces traction force on the cervical spinal cord.

Thus, the transition between the various phases of hood lift 310, hold time 320, and hood down 330 can be time dependant and/or event dependant. These can be derived from dynamic calculations as well as from solution sets maintained in an onboard data library or look up table. The phase transitions can also be triggered in whole or in part by dynamic conditions that evolve during the crash event including, but not limited to, dynamic impact loading.

Figure 4A:
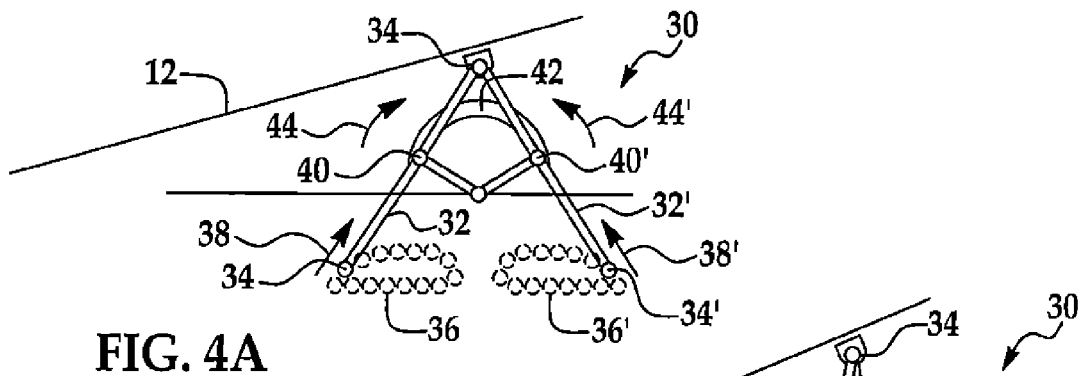
FIG. 4A and FIG. 4B are schematic depictions of a hood lift mechanism of the device of FIG. 3 according to an embodiment of the invention disclosed herein.
Figure 4B:
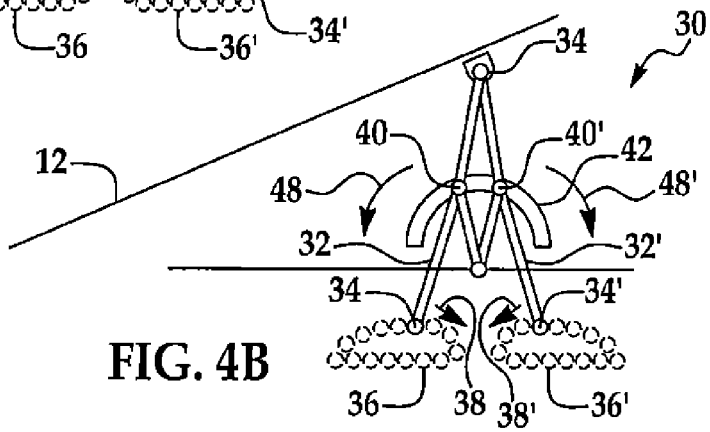

The hood lift mechanism 30 may be any mechanism configured to achieve elevate the rear end of the associated automotive hood 12 from the vehicle operation or use position to at least a first elevated lift position and achieve controlled retraction of the hood 12 from the first elevated lift position during a crash event. One nonlimiting embodiment of suitable hood elevating and retraction means is set forth in FIGS. 4A and 4B. The hood lift mechanism 30 is depicted in the non-deployed or vehicular use position in FIG. 4A and in the elevated or maximum stroke position in FIG. 4B.

The hood lift mechanism 30 includes a pair of scissors arms 32, 32' pivotally connected to one another at joint 34. Joint 34 is connected to hood 12 in a manner that permits pivotal movement of the arms 32, 32' relative to each other. The opposed ends 34, 34' of arms 32, 32' are each connected to suitable cam drives 36, 36'. Cam drives 36, 36' are configured to provide symmetrical rotation of the respective drives with forward direction of the cam drives 34, 34' being denoted by arrow 38, 38'. This motion translates in travel of pins 40, 40' in a direction toward one another relative to guide rail 42 in the direction of arrows 44, 44' with a general decrease in the interior angle defined by arms 32, 32'. This translates into upward movement of attached hood 12.

Further rotational movement of cam drives 36, 36' through the defined path 38, 38' of travel results in reversal of the travel of pins 40, 40' relative to guide rail 42 in the direction of arrows 48, 48' with associated increase in the interior angle defined by arms 32, 32' and decrease in the height of the elevation of hood 12.

Figure 3:
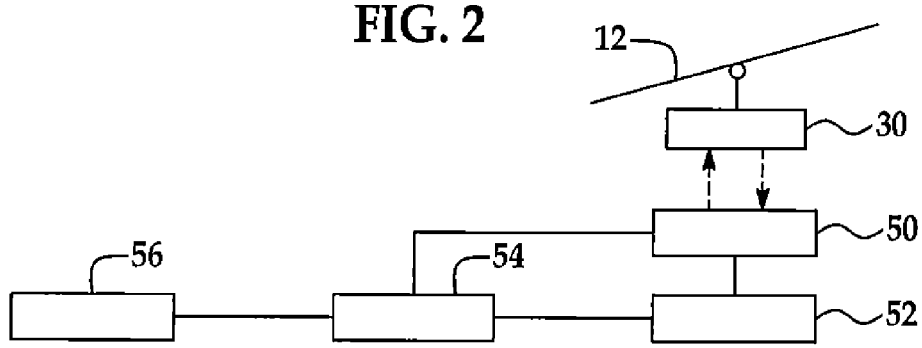
FIG. 3 is a schematic view of an active hood lift device according to an embodiment of the present invention as disclosed herein.

The hood lift mechanism 30 can be associated with a suitable control system. A nonlimiting example of such a system is illustrated in FIG. 3. The hood lift mechanism 30 is operatively connected to a suitable actuator 50 to initiate and control operation the hood lift mechanism 30 and associated hood 12. Actuator 52 is connected to at least one load cell 52, which provides output to electronic control unit 54.

The system depicted in FIG. 3 also includes crash sensor 56 configured to detect events occurring in the vehicle and its immediate surroundings associated with a pedestrian impact event. Nonlimiting examples of such events include at least one of sudden vehicle deceleration, detection of a pedestrian in the field of forward vehicle travel, and/or contact between pedestrian and vehicle. Detection of occurrence of such events is translated into output by the crash sensor 56 and is relayed to electronic control unit 54.

The crash sensor 56 can be a single unit or can be integrated with several different sensing units configured to detect one or more events or occurrences. Nonlimiting examples of suitable sensing units that can be combined or arranged in crash sensor 56 include at least one of a pedestrian sensor and vehicle diagnostic sensor. Suitable pedestrian sensors can include various vehicle-mounted devices configured to detect and identify pedestrians in the path of the vehicle. The pedestrian sensors can include contact sensors, radar, or visual detection devices, or a combination of both. The pedestrian sensors can be configured to ascertain parameters including but not limited to distance between pedestrian and vehicle, time to impact, pedestrian size and approximate weight, and the like. Suitable vehicle diagnostic sensors can include devices configured to inventory and evaluate vehicular operation parameters immediately prior to and during the crash interval. These include but are not limited to, vehicular speed, vehicular acceleration or deceleration, projected angle of impact, and the like.

Relevant data from crash sensor 56 and load cell 52 can be conveyed to electronic control unit 54 for formulation into suitable commands issued to actuator 50. The electronic control unit 54 can have any suitable configuration. Where desired or required, the electronic control unit 54 can be configured with a suitable look-up table or library of impact solutions based on variables such as pedestrian height, weight, angle of impact, vehicular speed, rate of acceleration and deceleration, etc. These can be accessed to determine optimal stroke of hood lift as well as hold time and/or degree of retraction to effectively absorb impact energy prior to any contact between head 22 and the striking vehicle.

Figure 5:
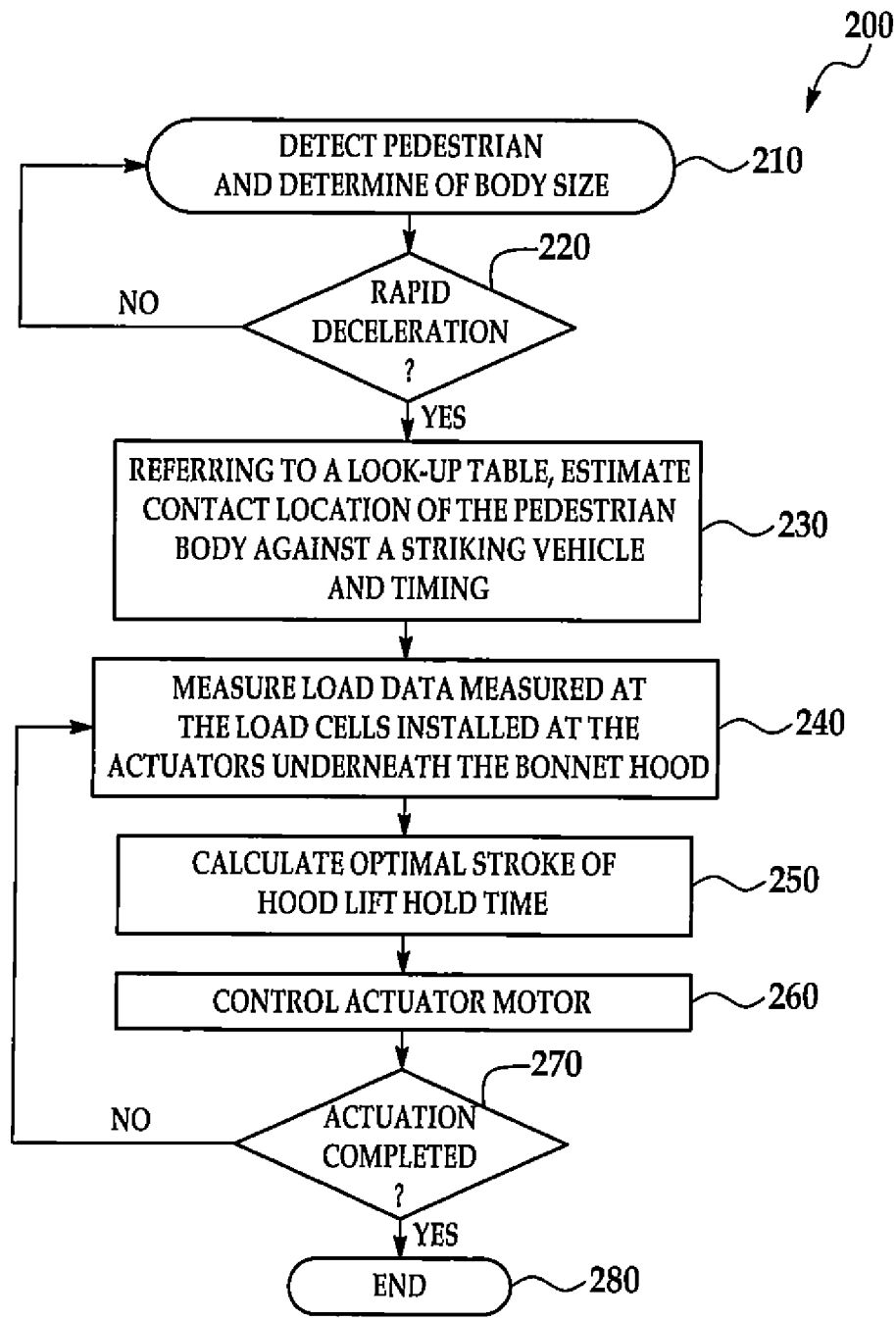
FIG. 5 is a process diagram of an embodiment of the method of the invention as disclosed herein.

A representative example of a suitable process sequence and logic is set forth in FIG. 5. The process sequence 200 commences with a defined triggering event such as detection of a pedestrian as at reference numeral 210. Pedestrian detection 210 can include various verification processes to confirm that the object in the vehicle path is a pedestrian. Validation processes can include estimation of pedestrian body size. Such data can be relayed to a suitable electronic control unit associated with the hood lift system.

Concurrent or subsequent to pedestrian detection, the vehicle can be assessed for the occurrence or onset of rapid vehicle deceleration as at reference numeral 220. Rapid vehicle deceleration can be ascertained from various inputs including, but not limited to, vehicle diagnostics and sensors associated with the braking system and the like.

In the process sequence 200, detection of a pedestrian in the field of vehicle travel as at 210 can prompt a plurality of responses including investigation regarding driver initiated rapid deceleration (i.e., braking) as well as determination of the level of deceleration achieved.

It is contemplated that scanning for pedestrians will occur in an essentially continuous manner predetermined intervals during normal vehicular operation. Pedestrian detection plus rapid vehicular deceleration will result in the initiation of various analytical routines based upon protocols and data maintained at a suitable location such as the electronic control unit associated with the active hood lift device. Initiation of such analytical routines is set forth in the process diagram at reference numeral 230. Various analytic operations that can be performed include, but are not limited to, reference to look-up table(s) housed within an associated electronic control unit in order to compare actual data to solution sets to generate an optimal response solution to control deployment and operation of the hood lift device.

During the process sequence 200, data regarding load occurring during impact can be measured by load cell(s) installed adjacent to various actuator(s) in the active hood lift device as at reference numeral 240. The data can be transmitted to the electronic controller unit to calculate the optimal stroke of hood lift and hold time as at reference numeral 250. The calculated solution can be used to control actuator and any drive devices associated with the hood lift device as at reference numeral 260. The cycle of load cell measurement, hood lift and hold time and motor control is repeated until the actuation cycle is complete as at reference numerals 220 and 280.

Figure 6:
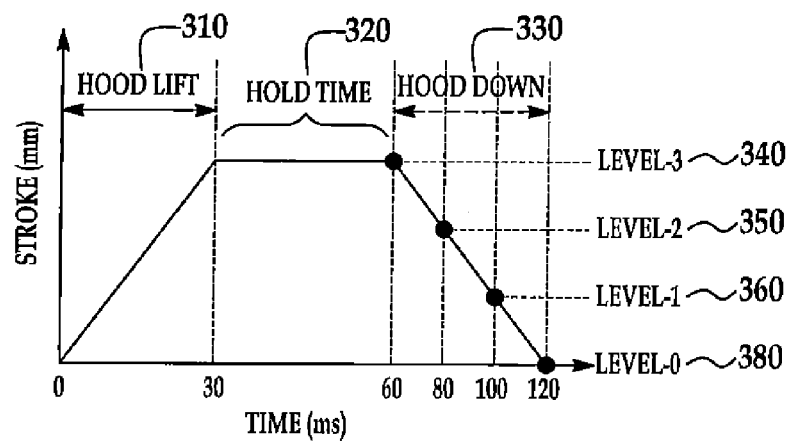
FIG. 6 is a graphic depiction of actively controlled stroke of hood lift cycle according to an embodiment of the invention disclosed herein.

A graphic representation of a hood lift cycle based upon the process sequence of FIG. 5 is depicted in FIG. 6. In the process depicted in FIG. 6, the stroke of hood lift can be controlled to provide a hood lift value calculated to impact energy based upon the particular crash parameters. The goal is to effectively absorb impact energy prior to primary contact between the pedestrian's head and the striking vehicle. For example, a $50^{th}$ percentile American male involved in a collision with a minivan-type vehicle operating at a striking velocity of 25 mph may require a combination of 500 mm hood lift deployed over a 30 ms interval. Stroke and/or duration of the hood lift interval 310 may vary based upon pedestrian characteristics and the like.

The hood lift cycle also includes a suitable hold time interval 320. During the hold time interval 320 the hood is maintained at or near the maximum attained stroke. The duration of hold time interval 320 is that sufficient to permit contact between pedestrian and hood. This interval can be governed by timers and data resident in any associated electronic control unit based upon characteristics such as pedestrian size and crash parameters. The hold time interval 320 can be governed by dynamic load data received through associated load cells. The hold time interval 320 can be determined by a combination of the two foregoing situations. The hold time interval can end at a moment that corresponds to a predetermined input load maximum. For example, for the $50^{th}$ percentile American noted above, a hold time 320 of 30 ms may be warranted.

The hood down or retraction interval 330 can be initiated at the defined point of maximum impact load as noted above. The hood down portion of the cycle involves the controlled lowering of the hood to a predetermined intermediate level (i.e., level—3 at 340; level—2 at 350; level 1 at 360) in order to minimize impact load experienced as the head makes primary contact with the striking vehicle. In the case of the $50^{th}$ percentile American male noted above, the reverse stroke of the hood during the hood down level may be to level—in an interval of 100 ms. The reverse stroke and/or duration of load down interval 330 can vary depending on pedestrian size, impact value, and the like.

The combination of hood stroke and cycle can be employed to yield optimum results and result in the desired "soft catch." It is contemplated that both the stroke value of the hood lift and the hold time can be adjusted to optimize for different sized pedestrians.

Various optimizations and combinations of stroke and hold can be derived from data maintained in the look-up table in the electronic control unit as well as by dynamic derivation based on load cell data. It is also contemplated that the data can be customized as to make and model of vehicle.

The method and device disclosed herein are predicated on the fundamental concept that the severity of pedestrian injury, particularly injuries to the brain, can be reduced by reducing the impact energy resulting from the pedestrian vehicle collision as soon as possible in the interval before the pedestrian head contacts the striking vehicle. Furthermore, it is believed that the method and device disclosed herein can contribute to reduced risk of precontact and postcontact traumatic brain injury in certain situations.

Figure 7:
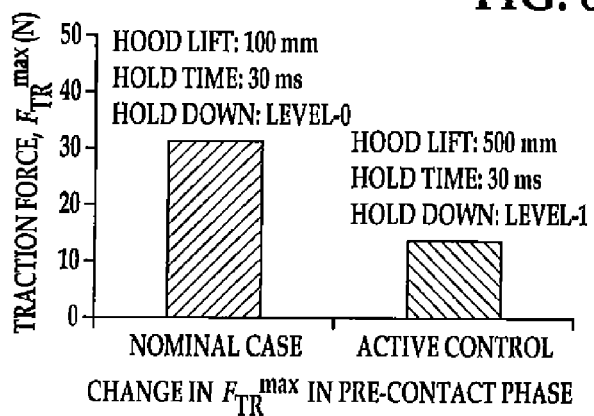
FIG. 7 is a graph comparing theoretical maximum average tractive force generated in the cervical spinal cord with and without the active hood lift device and method according to an embodiment of an invention disclosed herein.
Figure 8:
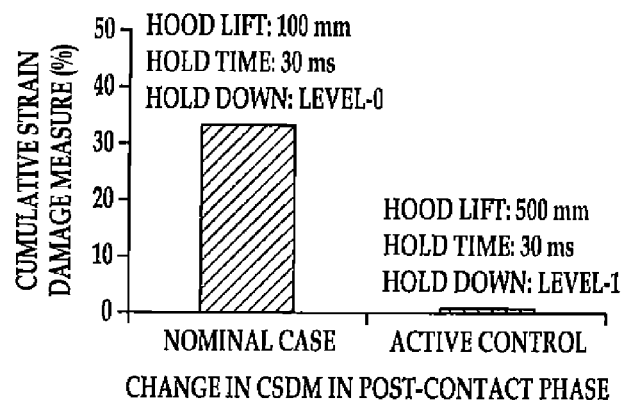
FIG. 8 is a graph comparing theoretical cumulative strain damage experienced as a result of impacts with and without the active hood lift device and method according to an embodiment of the invention disclosed herein.

FIGS. 7 and 8 present representative results for a minivan-to-AM50th percentile pedestrian collision. As shown in FIGS. 7 and 8, lifting the rear end of the hood up to a 500 mm stroke prior to primary head strike for a calculated striking velocity of 25 mph and implementing the cycle disclosed herein (specifically hood lift 30 ms; hold time 30 ms; hood down to level 1 in an interval less than 60 ms) resulted in significant reductions in significant reductions in both maximum average tractive force generated in the cervical spinal cord ($F_{TR}^{max}$) and cumulative slain damage measure (CDSM). For purposes of this analysis, $F_{TR}^{max}$ is calculated at the occipital condyle. In addition, the HIC value was reduced to less than 200 by actively controlling the pop-up hood system through deployment, hold time, and hood down cycles.

The effectiveness of the actively controlled hood lift system as disclosed herein is evaluated against systems that lack or omit the hood-down phase of the cycle. For this, a nominal case is proposed in which the same crash conditions are addressed with a hood lift scenario in which the stroke is 100 mm and hold time is 30 ms with a hood down to level 0. $F_{TR}^{max}$ was reduced to approximately ½ of the nominal case (~30N to 13 N) and CSDM was reduced to almost zero.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A method for reducing pedestrian injury resulting from collisions between a pedestrian and an automotive vehicle having a body and a hood having a forward end and a rear end proximate to the vehicular windshield and at least one actuator in operational communication between the automotive vehicle body and the hood, the hood oriented in a vehicle use position during vehicular operation, the method comprising:
   detecting the presence of a pedestrian in a path of travel of the automotive vehicle, wherein the deployment step occurs prior to or contemporaneously with physical contact between the pedestrian and the automotive vehicle;
   deploying the automotive hood from the vehicle use position with the front end of the hood and the rear end of the hood proximate to the vehicle body to a first elevated lift position wherein the rear end of the hood is elevated relative to the vehicle use position and the front end of the hood remains at a location proximate to the vehicle body, wherein the first elevated lift position locates the rear end to contact the pedestrian, and wherein activation of the at least one actuator relative to the vehicle body results in deployment of the hood;
   maintaining the rear end of the automotive hood in the first elevated position for an intermediate hold interval, the maintaining step accomplished, at least in part by the at least one actuator; and
   lowering the rear end of the automotive hood to at least one retracted position upon expiration of the intermediate hold interval together with the pedestrian, wherein the rear end of the hood in the retracted position is lower than the rear end of the hood in the first elevated lift position and wherein the position of the rear end of the hood is greater than or equal to the position of the rear end of the hood in the vehicle use position, wherein the lowering step is triggered by at least one actuator, such that the actuator controls the deploying, maintaining and lowering steps and wherein at least one of reverse stroke and duration of the lowering interval varies with pedestrian size.

2. The method of claim 1 wherein the deployment step occurs prior to physical contact between the pedestrian and the automotive vehicle.

3. The method of claim 1 wherein the automotive hood is deployed to a first elevated lift position wherein the rear end is between 100 mm and 500 mm above the use position.

4. The method of claim 3 wherein the lowering step includes the steps of controlled retraction of the automotive hood from the first elevated lift position to a retracted position over an interval.

5. The method of claim 4 wherein the automotive hood deploying step occurs prior to contact between the pedestrian and the automotive vehicle and wherein the maintaining step commences at a time proximate to initial contact between the pedestrian and the automotive hood.

6. The method of claim 5 wherein the pedestrian contacting the hood results in an impact having an impact value and wherein the automotive hood lowering step commences contemporaneously with contact between the pedestrian and the automotive front hood.

7. The method of claim 1 wherein the automotive front hood deployment step interval is sufficient to maintain alignment of pedestrian head and cervical spine and the automotive front hood maintenance and lowering steps proceed in a manner and interval sufficient to minimize at least one of centrifugal force due to body rotation and intracranial strain concentration upon direct head contact with the automotive vehicle.

8. A hood lift system for use with an automotive vehicle having body and a hood, the hood having a front end and an opposed rear end proximate to the windshield, the hood maintained in an operational use position during routine operation of the automotive vehicle, the hood lift system comprising:
   at least one crash sensor array mounted on the automotive vehicle, the crash sensor array configured to receive information associated with a crash event and convey at least one signal relevant thereto, the crash sensor array including:
      at least one pedestrian detection sensor, configured to detect a pedestrian located in an immediate field of vehicular travel of the automotive vehicle; and
      at least one vehicular diagnostic system configured to assess at least one vehicle performance characteristic;
   an elevating and retracting device configured to act on the rear end of the hood to move the rear end of the hood to and from an initial crash orientation, while the front end of the hood remains in the operational use position, wherein the hood elevating and retracting device is configured to lower the rear end of the automotive hood to a retracted position, wherein the rear end of the hood in the retracted position is lower than the rear end of the hood in the first elevated position and is elevated relative to the rear end of the hood when the rear end is in the vehicular use position;
   at least one actuator positioned between the vehicle body and the hood, the at least one actuator operatively connected to the elevating and retracting means;
   at least one load cell connected to the elevating and retracting means, the load cell configured to detect and calculate an impact load placed upon the front hood;
   an electronic control unit configured to receive at least one output from the crash sensor array and at least one output from the load cell and to formulate a command actionable on the at least one actuator based at least in part on the received outputs; and
   at least one mechanism configured to vary at least one of: an automotive hood elevation interval; a hold interval during which the rear end of the automotive hood is maintained at the first elevated position; a retraction interval during which the rear end of an automotive front hood is lowered from the first elevated position to the retracted position.

9. The hood lift system of claim 8 wherein the hood elevating means comprises:
   at least one arm member connected to the actuator and connected to the automotive hood at a location distal to the leading portion of the automotive vehicle;
   at least one controller, the controller in communication with the actuator device and the electronic control unit, the controller configured to initiate the actuation device upon receipt of a command from the electronic control unit to elevate the automotive hood to the first elevated position.

10. The hood lift system of claim 8 wherein the automotive hood elevating means is configured to elevate the rear edge of the automotive hood to a distance at least 100 mm about the position of the rear edge of the hood in the vehicular use position.

11. The hood lift system of claim 8 wherein the automotive hood elevating means is configured to elevate the rear edge of the automotive hood to a distance between 100 mm and 500 mm above the position of the rear edge of the hood in the vehicular use position.

12. A method for use during collisions between a pedestrian and an automotive vehicle equipped with the active hood lift device that includes at least one crash sensor array mounted on the automotive vehicle, the crash sensor array configured to receive information associated with a crash event and convey at least one signal relevant thereto, the crash sensor array including:
   at least one pedestrian detection sensor, configured to detect a pedestrian located in an immediate field of vehicular travel of the automotive vehicle; and
   at least one vehicular diagnostic system configured to assess at least one vehicle performance characteristic;
   at least one hood elevating actuator configured to elevate and retract the rear end of the hood to and from an initial crash orientation while maintaining a front end of the hood in the vehicular use position, wherein the hood elevating actuator is configured to lower the rear end of the automotive hood to a retracted position, wherein the retracted position is lower than the first elevated position and is elevated relative to the vehicular use position;
   at least one load cell connected to the hood elevating actuator, the load cell configured to detect and calculate an impact load placed upon the front hood;
   an electronic control unit configured to receive at least one output from the crash sensor array and at least one output from the load cell and to formulate a command actionable on the at least one actuator based at least in part on the received outputs; and
   means for varying at least one of an automotive hood elevation interval; a hold interval during which the rear end of the automotive hood is maintained at the first elevated position; and a retraction interval during which the automotive front hood is lowered from the first elevated position to the retracted position, wherein the method comprises:
   electronically detecting the presence of a pedestrian in a field of vehicular travel using the at least one sensor mounted on the automotive vehicle;
   electronically assessing at least one characteristic of vehicular travel upon electronic detection of the pedestrian, wherein the at least one characteristic of vehicular travel includes at least one of the following: vehicle speed, vehicle deceleration;
   transmitting data regarding presence of the pedestrian and assessment of the at least one characteristic of vehicular travel to an electronic control unit;
   evaluating data produced in the electronic detection step and the electronic assessment step in the electronic control unit, the evaluation step resulting in at least one response command actionable on the automotive hood elevating means and the at least one actuator;
   elevating the rear edge of the automotive hood to a first elevated lift position, wherein the elevation step occurs by action of the at least one actuator on the elevating means and the automotive hood;
   maintaining the rear edge of the automotive front hood in the first elevated lift position for an intermediate hold interval, wherein the maintaining step is controlled by the elevating means and the at least one actuator; and
   lowering the automotive hood relative to the vehicle body to at least one retracted position upon expiration of the intermediate hold interval together with the pedestrian, wherein the retracted position is lower than the first elevated lift position and is greater than or equal to the vehicle use position, wherein the lowering step is controlled by the elevating means and the at least one actuator.

13. The method of claim 12 wherein the automotive front hood elevation step occurs prior to contact between the associated automotive vehicle and the pedestrian.

14. The method of claim 12 wherein initial contact between the automotive front hood of the associated automotive vehicle and the pedestrian occurs at the outset of the hood elevation maintenance interval.

15. The method of claim 14 wherein the maintenance interval concludes proximate to full contact between the automotive hood and the pedestrian.

16. The method of claim 14 wherein the rear edge of the hood is elevated greater than 100 mm from the vehicular use position.

* * * * *